(12) United States Patent
Yamada

(10) Patent No.: US 10,693,365 B2
(45) Date of Patent: Jun. 23, 2020

(54) POWER CONVERSION CIRCUIT WITH A COMPENSATION CIRCUIT

(71) Applicant: Fuji Electric Co., Ltd., Kanagawa (JP)

(72) Inventor: Ryuji Yamada, Tokyo (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 0 days.

(21) Appl. No.: 16/405,626

(22) Filed: May 7, 2019

(65) Prior Publication Data

US 2019/0356236 A1 Nov. 21, 2019

(30) Foreign Application Priority Data

May 21, 2018 (JP) .................................. 2018-096839

(51) Int. Cl.
*H02M 1/42* (2007.01)
*H02M 1/44* (2007.01)

(52) U.S. Cl.
CPC ........... *H02M 1/4225* (2013.01); *H02M 1/44* (2013.01)

(58) Field of Classification Search
CPC .... H02M 1/42; H02M 1/4208; H02M 1/4225; H02M 1/425; H02M 1/44; H02M 3/156–158
See application file for complete search history.

(56) References Cited

U.S. PATENT DOCUMENTS

| | | | | |
|---|---|---|---|---|
| 6,377,032 B1* | 4/2002 | Andruzzi | ............ | H02M 3/1588 323/224 |
| 10,097,082 B1* | 10/2018 | Turchi | ................. | H02M 3/156 |
| 2007/0165427 A1* | 7/2007 | McDonald | ............ | H02M 1/143 363/41 |
| 2011/0096577 A1 | 4/2011 | Yamada | | |
| 2013/0194845 A1* | 8/2013 | Bianco | ................ | H02M 1/4225 363/90 |
| 2013/0201731 A1* | 8/2013 | Gu | ....................... | H02M 1/4225 363/21.17 |
| 2013/0294125 A1* | 11/2013 | Chen | .................... | H02M 7/217 363/89 |
| 2013/0307497 A1* | 11/2013 | Chen | ................... | H02M 3/1563 323/235 |
| 2014/0369097 A1* | 12/2014 | Prescott | ............. | H02M 1/4225 363/89 |
| 2016/0181942 A1* | 6/2016 | Sugawara | ............ | H02M 3/156 363/126 |

FOREIGN PATENT DOCUMENTS

| | | |
|---|---|---|
| JP | 2001-25242 A | 1/2001 |
| JP | 2003-153542 A | 5/2003 |
| JP | 2011-120440 A | 6/2011 |
| JP | 2013-055797 A | 3/2013 |

* cited by examiner

*Primary Examiner* — Fred E Finch, III
*Assistant Examiner* — Rafael O. De León Domenech
(74) *Attorney, Agent, or Firm* — Chen Yoshimura LLP

(57) ABSTRACT

In a power conversion circuit in which a grounded capacitor is connected to a main circuit that converts power through operation of a semiconductor switching device, a control IC that supplies a drive signal to the semiconductor switching device generates a cancellation voltage for canceling out a conducted emission that develops across terminals of the grounded capacitor as a result of the operation of the semiconductor switching device by using the drive signal (gate signal) to control a charge/discharge current of a compensation capacitor in a compensation circuit that is externally connected to the main circuit.

20 Claims, 6 Drawing Sheets

POWER CONVERSION CIRCUIT WITH A COMPENSATION CIRCUIT

BACKGROUND OF THE INVENTION

Technical Field

The present invention relates to a technology for suppressing common-mode noise caused by conducted emissions in a power conversion circuit.

Background Art

In power conversion circuits such as power factor correction (PFC) circuits, for example, conducted emissions occur when high-frequency voltages resulting from the switching of semiconductor switching devices get voltage-divided by a grounded capacitor via so-called parasitic capacitance.

These conducted emissions create leakage current (common-mode current) that circulates between the power conversion circuit and ground and becomes common-mode noise, which has a negative effect on peripheral circuits. Therefore, in the past, power conversion circuits with various noise countermeasures implemented have been provided.

Patent Document 1, for example, discloses the PFC circuit illustrated in FIG. 7, in which a common-mode noise countermeasure has been implemented.

In FIGS. 7, 101 and 102 are AC input terminals, 201 and 202 are DC output terminals, $C_f$ and $C_o$ are filter capacitors, $C_e$ is a grounded capacitor, $D_1$ to $D_5$ are diodes, L is a reactor, $L_a$ is the auxiliary winding of the reactor L, $C_c$ is a compensation capacitor, and $Q_1$ is a semiconductor switching device such as a MOSFET.

In this PFC circuit, by switching the switching device $Q_1$ ON and OFF, energy is repeatedly stored in and discharged from the reactor L while maintaining the input power factor to be substantially equal to 1, and the output voltage of a rectifier circuit constituted by the diodes $D_1$ to $D_4$ is boosted and supplied to a DC load (not illustrated in the figure).

Here, the ON/OFF switching of the switching device $Q_1$ causes the drain-source voltage $V_{sw}$ to change at high frequency and generates a conducted emission (conducted emission voltage) $V_{ns}$, which in turn causes a leakage current $I_s$ to flow through a parasitic capacitance $C_s$. FIG. 8 is a waveform diagram illustrating the drain-source voltage $V_{sw}$ of the switching device $Q_1$ as well as the conducted emission (conducted emission voltage) $V_{ns}$ and the leakage current $I_s$. Note that because the leakage current $I_s$ is small, there are also paths other than the path illustrated in FIG. 7. For example, when the diode $D_4$ is in the conducting state due to the primary circuit current, the current $I_s$ flows backwards from the grounded capacitor $C_e$ through the diode $D_4$ and returns to ground via the freewheeling diode of the switching device $Q_1$ and the parasitic capacitance $C_s$.

In the PFC circuit in FIG. 7, setting the number of turns of the auxiliary winding $L_a$ to be 1/n the number of turns in the reactor L and setting the capacitance of the compensation capacitor $C_c$ to be n times the parasitic capacitance $C_s$ creates a compensation voltage $V_c$ ($=V_{ns}/n$) across the terminals of the auxiliary winding $L_a$, which causes a compensation current $I_c$ of equal magnitude to the leakage current $I_s$ to flow in the opposite direction and cancel out the leakage current $I_s$.

Next, the reason for including the grounded capacitor $C_e$ will be described. In the following description, the reference characters $C_f$, $C_e$, $C_c$, and $C_o$ given to the capacitors will also be used to represent the respective capacitance values of those capacitors.

The voltage $V_{sw}$ resulting from the switching of the switching device $Q_1$ is voltage-divided by a series circuit constituted by the parasitic capacitance $C_s$ and the grounded capacitor $C_e$ and appears as fluctuations in the voltage at the AC input terminal 102 relative to the ground. This voltage of the AC input terminal 102 relative to the ground (that is, the conducted emission $V_{ns}$) can be represented in the form of equation 1 below.

$$V_{ns}=C_s/(C_e+C_s)\cdot V_{sw} \quad \text{<Equation 1>}$$

Setting the capacitance of the grounded capacitor $C_e$ such that $C_e \gg C_s$ allows equation 2 to be obtained from equation 1.

$$V_{ns} \approx (C_s/C_e)\cdot V_{sw} \quad \text{<Equation 2>}$$

Moreover, setting the capacitance of the filter capacitor $C_f$ to a value at least one order of magnitude greater than that of the grounded capacitor $C_e$ makes it possible to treat the filter capacitor $C_f$ as being equivalent to a short-circuit to high-frequency current.

Considering for a moment a case in which the grounded capacitor $C_e$ is not included and the AC input terminal 102 is connected to ground as-is, from equation 1 $V_{ns}$ would be equal to $V_{sw}$, and that voltage $V_{ns}$ on the order of several hundred volts would itself become the fluctuations in the voltage relative to the ground of the circuit. In general-purpose power supplies and the like, such voltage fluctuations are not permissible, and therefore the grounded capacitor $C_e$ is a necessary component.

Next, FIG. 9 is a circuit diagram of a switching power supply disclosed in Patent Document 2.

In FIG. 9, 111 and 112 are DC input terminals, $C_1$ to $C_3$ are capacitors, $L_1$ and $L_2$ are a primary winding and a secondary winding of a transformer T, 110 is a control circuit, 210 is a rectifying and smoothing circuit, and, similar to in FIG. 7, $Q_1$ is a semiconductor switching device and 201 and 202 are DC output terminals.

In this conventional technology, by connecting a compensation capacitor $C_3$ of prescribed capacitance between the gate of the switching device $Q_1$ and the secondary winding $L_2$ of the transformer T, leakage current that flows through the parasitic capacitance $C_s$ of the transformer T during switching is canceled out by a compensation current that flows through the compensation capacitor $C_3$ in the opposite direction.

RELATED ART DOCUMENTS

Patent Documents

Patent Document 1: Japanese Patent Application Laid-Open Publication No. 2003-153542 (paragraphs [0035] and [0036], FIGS. 1 to 5, etc.)

Patent Document 2: Japanese Patent Application Laid-Open Publication No. 2001-25242 (paragraphs [0013] to [0016], FIG. 2, etc.)

SUMMARY OF THE INVENTION

In the conventional technology illustrated in FIG. 7, the use of the reactor L that includes the auxiliary winding $L_a$ means that it is not possible to use general-purpose components, which results in a problematic increase in cost.

Moreover, although the leakage current arises as a result of the switching device $Q_1$ being switched ON and OFF in accordance with a gate signal, in general the ON/OFF switching of the switching device $Q_1$ is delayed relative to the timing of the gate signal, and therefore there is a delay time between the timing of the gate signal and the timing at which the leakage current occurs.

As a result, in order to reliably cancel out leakage current using the conventional technology in FIG. 9, this delay time must be taken into account when designing the circuit. However, Patent Document 2 contains no discussion of this requirement nor of a means of resolution.

Furthermore, it is well-known that the gates of semiconductor switching devices are extremely sensitive to noise. In FIG. 9, directly connecting the gate terminal of the switching device $Q_1$ to another part of the circuit via the capacitor $C_3$ creates a significant risk of malfunctions or damage to the switching device $Q_1$ due to oscillations or overvoltage. In order to avoid this, a means of generating the compensation current in an isolated manner from the gate is necessary, which problematically complicates design of the control circuit.

Therefore, the problem to be solved by the present invention is to make it possible to freely and easily adjust a compensation current for canceling out leakage current arising from conducted emissions.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a power conversion circuit, including: semiconductor switching device; a main circuit that performs power conversion through switching on and off of the semiconductor switching device, the main circuit including a controller that supplies a drive signal to the semiconductor switching device to switch on and off the semiconductor switching element, a grounded capacitor connected to the main circuit; a compensation circuit separate from the main circuit, connected to the main circuit, the compensation circuit including a compensation capacitor; and a compensation generator connected to the compensation circuit, the compensation generator charging and discharging the compensation capacitance on the basis of the drive signal so as to generate a cancellation voltage across the compensation capacitor that causes a conducted emission voltage across terminals of the grounded capacitor generated as a result of the switching on and off of the semiconductor switching device to be cancelled out, thereby eliminating conducted emission, wherein the compensation generator is included within the main circuit or within the compensation circuit.

In the above-mentioned power conversion circuit, the compensation generator may be included within the controller of the main circuit, and the compensation generator may include a first current source for charging the compensation capacitor and a second current source for discharging the compensation capacitor that are alternately switched in accordance with the drive signal.

In the above-mentioned power conversion circuit, the controller may be integrated with the first and second current sources into a single integrated circuit.

In the above-mentioned power conversion circuit, the compensation circuit may further include a delay time setter that adjusts timings at which the compensation capacitor is charged and discharged in accordance with delay times in ON and OFF switching of the semiconductor switching device relative to the drive signal.

In the above-mentioned power conversion circuit, the delay time setter may include a series circuit made of a parallel circuit constituted by a diode and a resistor and a delay time setting capacitor that is connected in series to the parallel circuit, and the series circuit may be connected between a ground voltage and the first and second current sources that are alternately switched in accordance with the drive signal.

In the above-mentioned power conversion circuit, a first series circuit constituted by a diode and a resistor may be connected in series to the compensation capacitor for adjusting a leading edge slope of the cancellation voltage, and a second series circuit constituted by a diode and a resistor may be connected in series to the compensation capacitor for adjusting a trailing edge slope of the cancellation voltage.

In the above-mentioned power conversion circuit, the first and second series circuits may be included within the compensation circuit.

In the above-mentioned power conversion circuit, the compensation generator may be included within the controller of the main circuit, the compensation generator may include a first current source for charging the compensation capacitor and a second current source for discharging the compensation capacitor that are alternately switched in accordance with the drive signal, the compensation circuit further may include a delay time setter that adjusts timings at which the compensation capacitor is charged and discharged in accordance with delay times in ON and OFF switching of the semiconductor switching device relative to the drive signal, the delay time setter may include a series circuit made of a parallel circuit constituted by a diode and a resistor and a delay time setting capacitor that is connected in series to the parallel circuit, and the series circuit is connected between a ground voltage and the first and second current sources that are alternately switched in accordance with the drive signal, and the compensation circuit may further include a first series circuit constituted by a diode and a resistor connected in series to the compensation capacitor for adjusting a leading edge slope of the cancellation voltage, and a second series circuit constituted by a diode and a resistor connected in series to the compensation capacitor for adjusting a trailing edge slope of the cancellation voltage.

In the above-mentioned power conversion circuit, the compensation generator and the compensation circuit may be configured to generate the cancellation voltage that has ON/OFF delay times, a leading edge slope and a trailing edge slop that respectively correspond to ON/OFF delay times, a leading edge slope and a trailing edge slope of the conducted emission voltage.

In the present invention, controlling the charge/discharge current of the compensation capacitor in the compensation circuit that is externally connected to the main circuit makes it possible to generate and introduce into the circuit a cancellation voltage that is appropriate for canceling out conducted emissions and the resulting leakage current.

Moreover, in the compensation circuit, including the delay time setter that adjusts the charge/discharge timing of the compensation capacitor in accordance with the delay time in the ON/OFF switching of the semiconductor switching device makes it possible to suppress conducted emissions more reliably.

It is to be understood that both the foregoing general description and the following detailed description are exemplary and explanatory, and are intended to provide further explanation of the invention as claimed.

DETAILED DESCRIPTION OF EMBODIMENTS

Next, embodiments of the present invention will be described with reference to figures.

Figure 1:
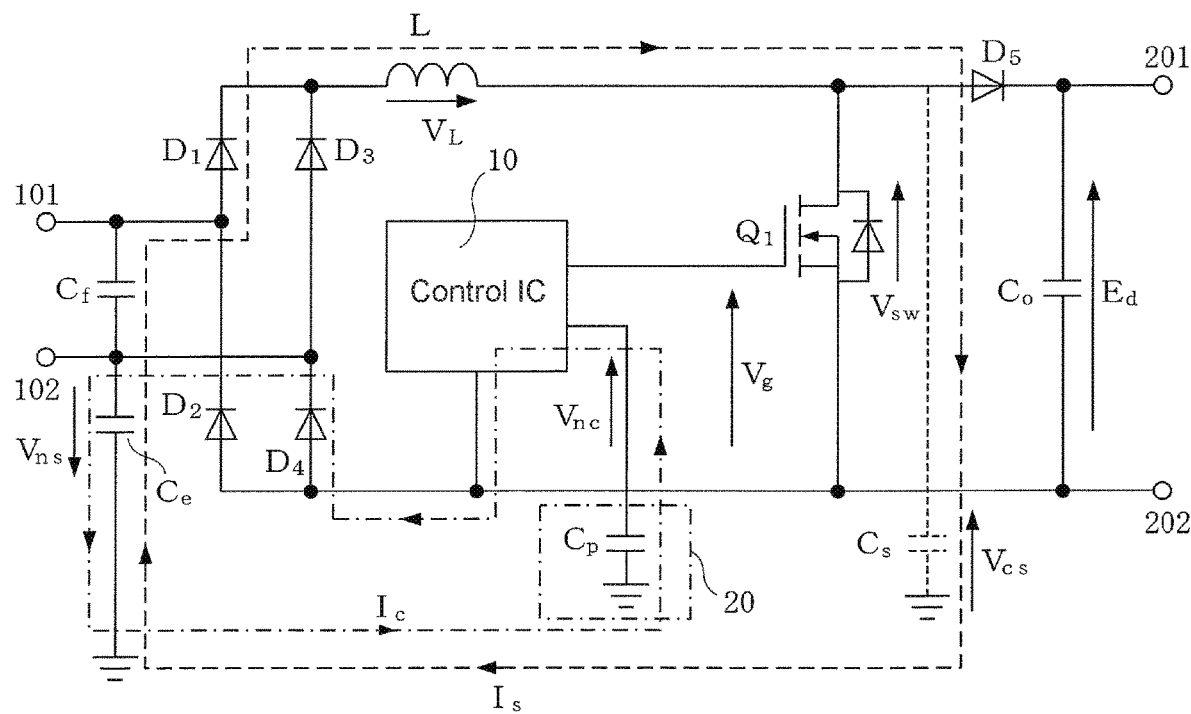
FIG. 1 is a circuit diagram illustrating an embodiment of the present invention.

FIG. 1 illustrates a power conversion circuit according to an embodiment of the present invention. Although in this embodiment a non-isolated AC-DC conversion circuit such as a PFC circuit will be described, the present invention is not limited to being applied to this type of circuit and can also be applied to various other types of power conversion circuits including DC-DC conversion circuits.

Figure 7:
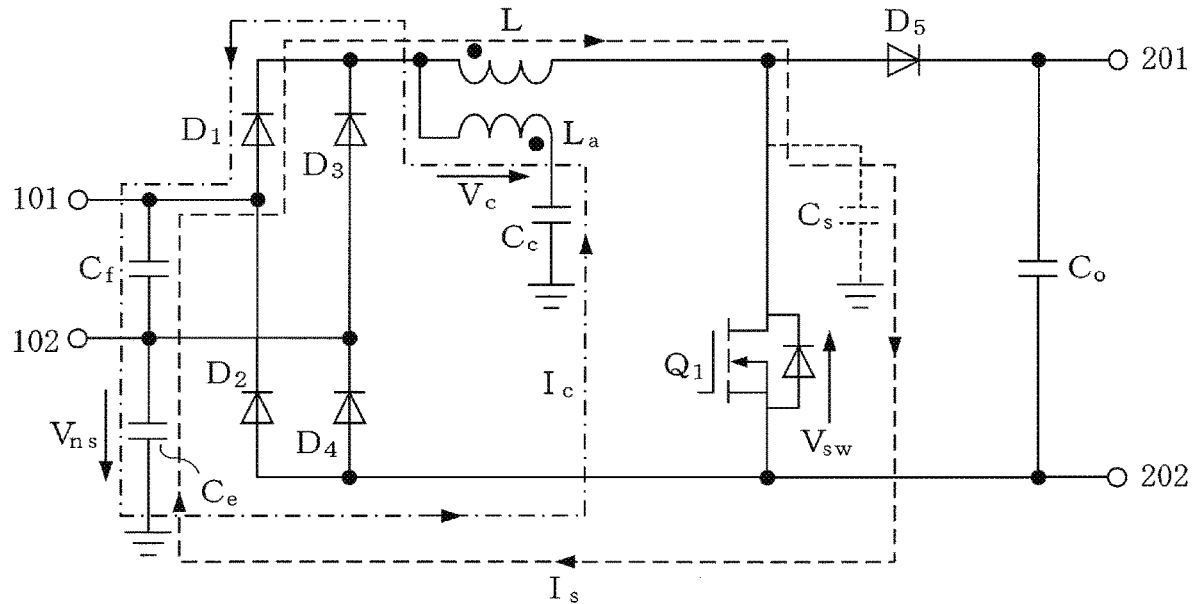
FIG. 7 illustrates a PFC circuit disclosed in Patent Document 1.
Figure 8:
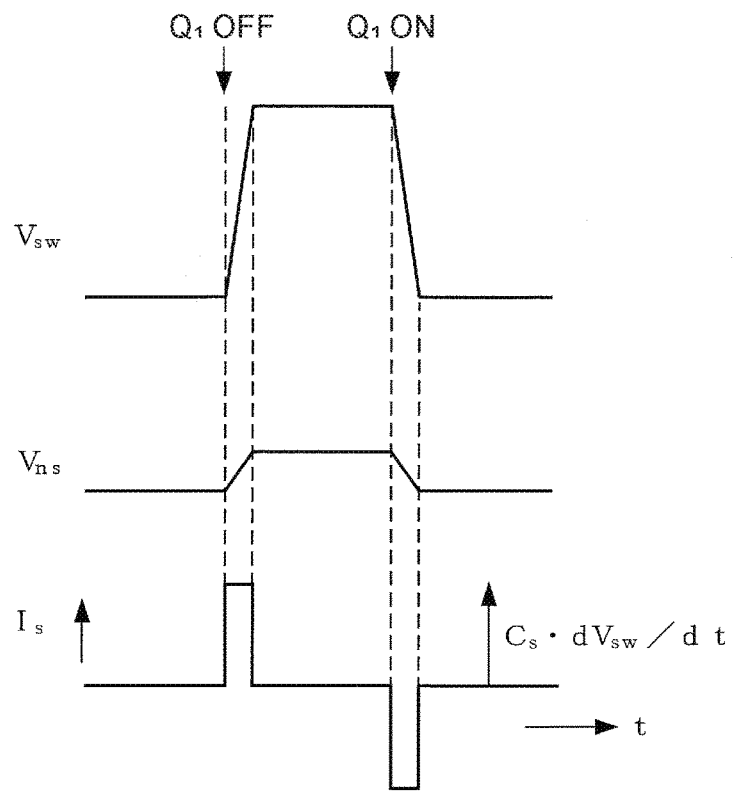
FIG. 8 is a waveform diagram illustrating the drain-source voltage $V_{sw}$ of a switching device in FIG. 7 that changes as the switching device switches ON and OFF as well as a conducted emission $V_{ns}$ and a leakage current $I_s$.
Figure 9:
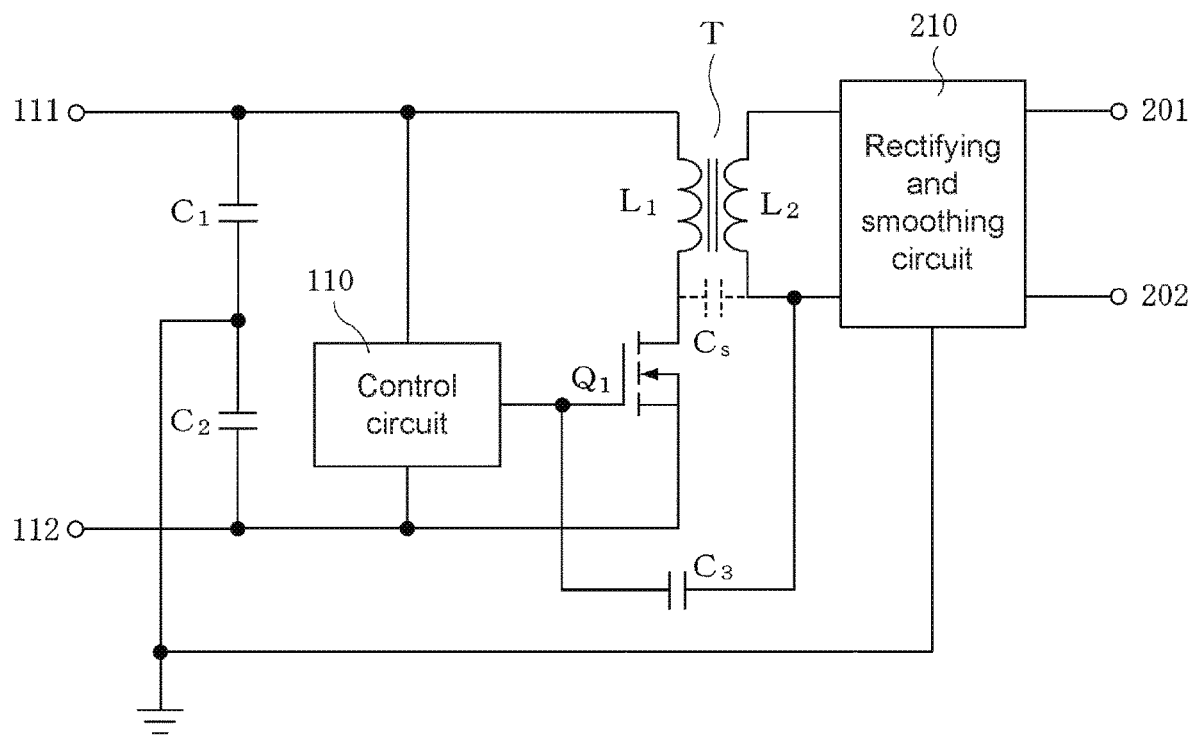
FIG. 9 is a circuit diagram of a switching power supply disclosed in Patent Document 2.

With respect to FIG. 1, in order to avoid redundancy, portions that are the same as in FIG. 7 will not be described again here, and the following description will focus on portions that are different from in FIG. 7.

In the power conversion circuit in FIG. 1, a compensation circuit 20 including a compensation capacitor $C_p$ or the like can be connected as an external component to a control IC 10 which supplies a gate signal to a semiconductor switching device (hereinafter, also referred to simply as a "switching device") $Q_1$.

Moreover, in this circuit as well, the drain-source voltage $V_{sw}$ changes at high frequency due to the ON/OFF switching of the switching device $Q_1$, and a conducted emission $V_{ns}$ develops across the terminals of a grounded capacitor $C_e$. As described above, this is due to the flow of a leakage current $I_s$ through a parasitic capacitance $C_s$ along the path illustrated in the figure, for example, and therefore the present embodiment aims to cancel out this leakage current $I_s$ with a compensation current $I_c$ in order to thereby reduce common-mode noise.

Figure 2:
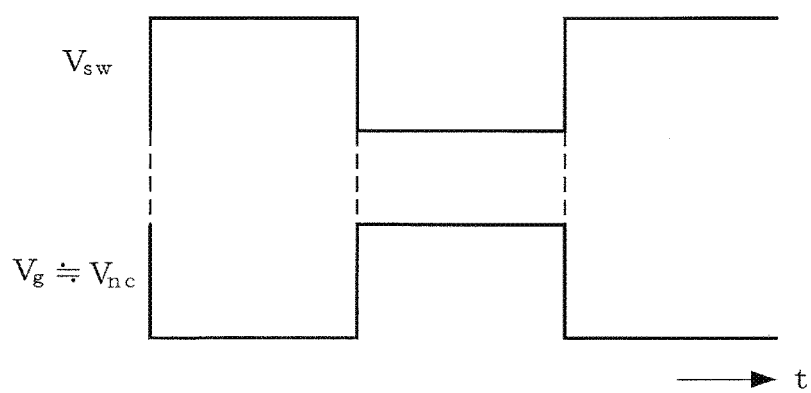
FIG. 2 is a voltage waveform diagram for explaining the basic concept of the present invention.

First, as illustrated in the conceptual diagram in FIG. 2, the logical level of the drain-source voltage $V_{sw}$ of the switching device $Q_1$ (which is the root cause of the conducted emission $V_{ns}$) is substantially inverted relative to a gate voltage $V_g$.

Therefore, on the basis of the gate signal, the control IC 10 generates a cancellation voltage $V_{nc}$ of prescribed magnitude and the same logical level as the gate voltage $V_g$ and applies this cancellation voltage $V_{nc}$ to the main circuit in order to induce a compensation current $I_c$, thereby making it possible to cancel out the leakage current $I_s$ resulting from the conducted emission $V_{ns}$ and to thereby reduce common-mode noise.

Here, the term "main circuit" refers to the primary portion of the power conversion circuit which outputs a prescribed DC power through operation of the switching device $Q_1$ and includes the leakage current (common-mode current) path (but does not include the compensation circuit 20, which is an external component).

Moreover, the compensation circuit 20 has a feature for adjusting the slope of the cancellation voltage $V_{nc}$ as well as the delay time between the gate signal timing and the ON/OFF switching of the switching device $Q_1$ as the control IC 10 generates the cancellation voltage $V_{nc}$.

Figure 3:
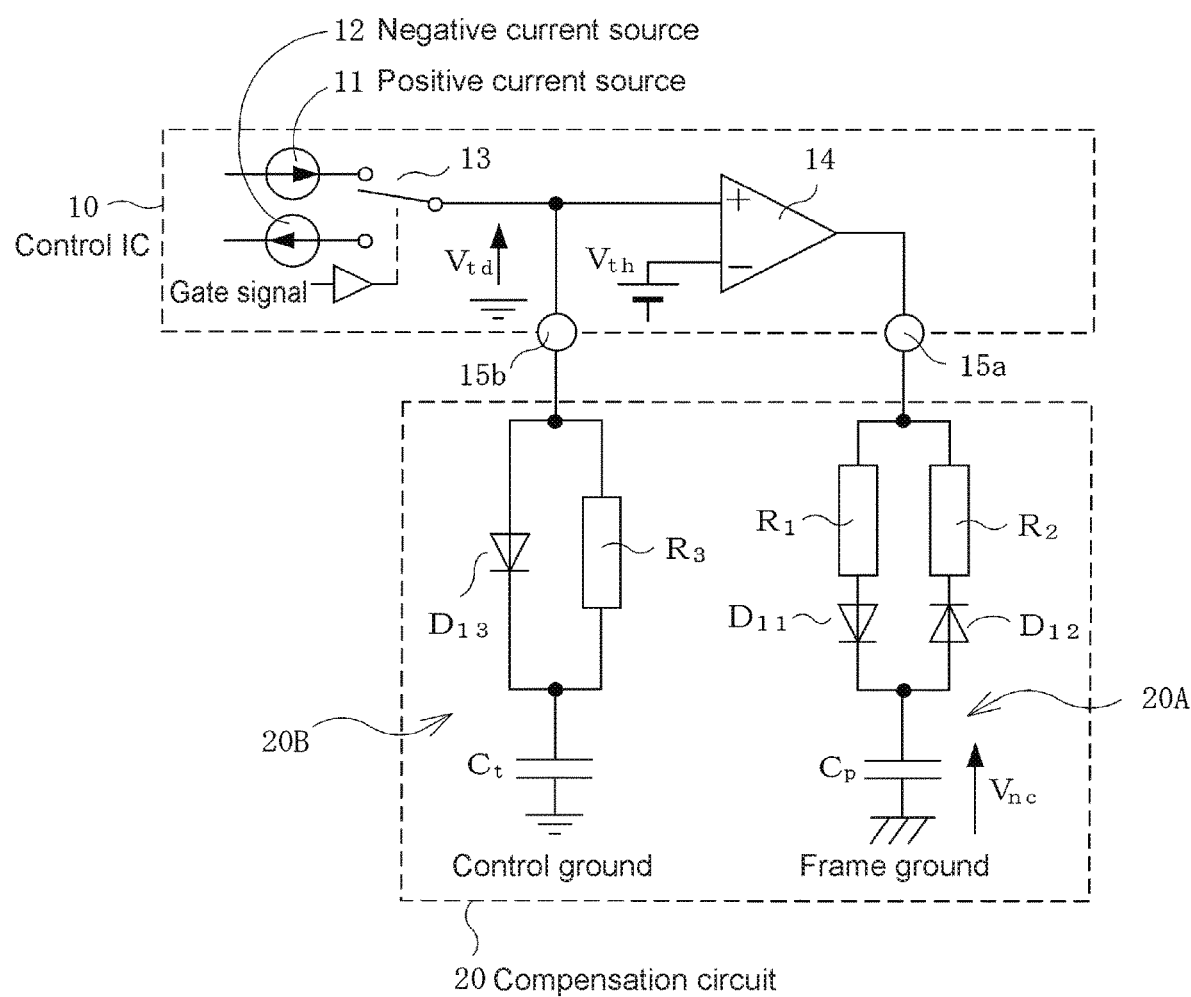
FIG. 3 is a schematic drawing of a compensation circuit and a compensation generator portion of a control IC in FIG. 1.

FIG. 3 illustrates a compensation generator portion of the control IC 10 and the internal configuration of the compensation circuit 20. As described above, the compensation circuit 20 is formed as an external component and can be electrically connected to a cancellation signal terminal 15a and a delay time setting terminal 15b of the control IC 10.

The compensation generator portion of the control IC 10 includes a positive current source 11 and a negative current source 12, and these current sources 11 and 12 are connected to switching terminals of a switch 13 that is switched by the gate signal of the switching device $Q_1$. The voltage of a common terminal of the switch 13 is input to a non-inverting input terminal of a comparator 14 as a delay time setting voltage $V_{td}$, and a threshold voltage $V_{th}$ is input to an inverting input terminal of the comparator 14.

The non-inverting input terminal of the comparator 14 is connected to the compensation circuit 20 via the delay time setting terminal 15b, and an output terminal of the comparator 14 is connected to the compensation circuit 20 via the cancellation signal terminal 15a.

In the compensation circuit 20, a series circuit constituted by a charging resistor $R_1$ and a diode $D_{11}$ as well as a series circuit constituted by a charging resistor $R_2$ and a diode $D_{12}$ are connected together in parallel between the cancellation signal terminal 15a and one end of the compensation capacitor $C_p$. The diodes $D_{11}$ and $D_{12}$ are reversed in orientation relative to one another, and the other end of the compensation capacitor $C_p$ is frame-grounded. The components described above form a cancellation voltage setter 20A.

In addition, the delay time setting terminal 15b is connected to one end of a delay time setting capacitor $C_t$ via a parallel circuit constituted by a resistor $R_3$ and a diode $D_{13}$, and the other end of the capacitor $C_t$ is grounded as a control ground. These components form a delay time setter 20B.

Note that although in FIG. 1 the ground of the compensation capacitor $C_p$ in the compensation circuit 20 is depicted as being a frame ground in order to explain the path of the compensation current $I_c$ (described later), the frame ground of the compensation capacitor $C_p$ in FIG. 3 is connected to the AC input terminal 102 in FIG. 1 via the grounded capacitor $C_e$, and the AC input terminal 102 is connected to the output terminal 202 (that is, to the control ground) either directly or via filter capacitors $C_f$ and $C_o$. The capacitance values of the grounded capacitor $C_e$ and the filter capacitors $C_f$ and $C_o$ are sufficiently greater than that of the compensation capacitor $C_p$, and therefore with respect to the leakage current and compensation current (which are high-frequency currents), the frame ground can be treated as having the same electrical potential as the control ground.

Figure 4:
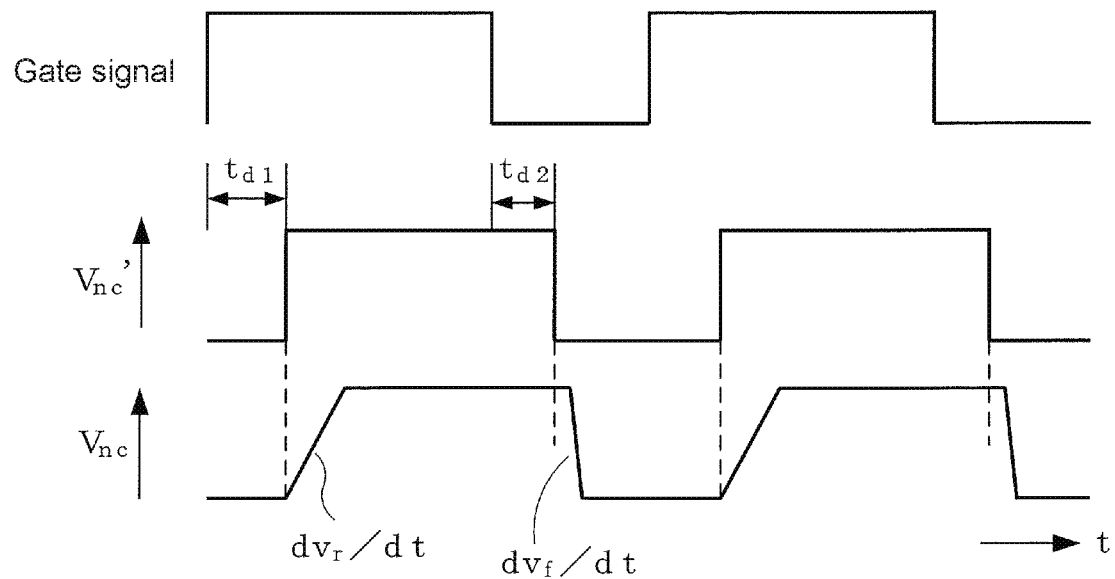
FIG. 4 is a waveform diagram illustrating a gate signal for a switching device, a cancellation voltage $V_{nc}'$ when considering delay times, and a cancellation voltage $V_{nc}$ when considering the slope of a drain-source voltage $V_{sw}$ of the switching device $Q_1$ at turn-on and turn-off.

Next, FIG. 4 is a waveform diagram illustrating the gate signal for the switching device $Q_1$, a cancellation voltage $V_{nc}'$ when considering only delay times $t_{d1}$ and $t_{d2}$ at turn-on and turn-off of the switching device $Q_1$, and the cancellation voltage $V_{nc}$ when considering $dv_r/dt$ and $dv_f/dt$ (which are the slope of the voltage $V_{sw}$ at turn-on and turn-off). Although this is not illustrated in the figure, the logical level of the drain-source voltage $V_{sw}$ of the switching device $Q_1$ is inverted relative to the gate signal.

As described above, there is a time lag between the gate signal and the ON/OFF switching of the switching device $Q_1$ (that is, the change in the drain-source voltage $V_{sw}$ of the switching device $Q_1$), and therefore the control IC 10 needs to generate a cancellation voltage $V_{nc}'$ that incorporates the delay times $t_{d1}$ and $t_{d2}$ relative to the gate signal, as illustrated in the middle in FIG. 4.

However, the drain-source voltage $V_{sw}$ of the switching device $Q_1$ does not rise or fall instantaneously and instead changes with a prescribed rising slope $dv_r/dt$ and falling slope $dv_f/dt$. Moreover, the magnitudes (absolute values) of these slopes $dv_r/dt$ and $dv_f/dt$ are generally not equal.

Therefore, as illustrated at the bottom of FIG. 4, the control IC 10 generates a reversed-polarity cancellation voltage $V_{nc}$ in which the delay times $t_{d1}$ and $t_{d2}$ and the slopes $dv_r/dt$ and $dv_f/dt$ are appropriate for the actual drain-source voltage $V_{sw}$, thereby making it possible to cancel out the leakage current resulting from the voltage $V_{sw}$.

Here, the delay times $t_{d1}$ and $t_{d2}$ can be set by the delay time setter 20B in the compensation circuit 20 in FIG. 3, and the slopes $dv_r/dt$ and $dv_f/dt$ can be set by the cancellation voltage setter 20A in the compensation circuit 20.

Next, a method of setting the delay times $t_{d1}$ and $t_{d2}$ will be described.

Figure 5:
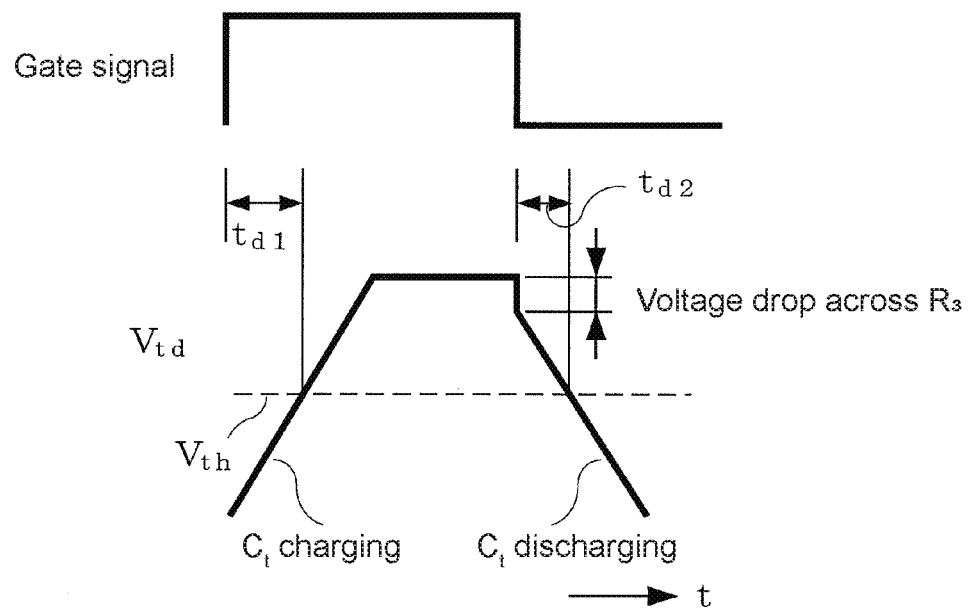
FIG. 5 is a waveform diagram illustrating the relationship between the gate signal for the switching device and a delay time setting voltage.

First, as illustrated in FIG. 5, when the gate signal is at a High level in order to switch ON the switching device $Q_1$, the switch 13 in FIG. 3 gets connected to the positive current source 11 side, and the delay time setting capacitor $C_t$ in the compensation circuit 20 gets charged via the diode $D_{13}$. At this time, the resistor $R_3$ is short-circuited by the diode $D_{13}$.

The voltage of the delay time setting capacitor $C_t$ is applied to the non-inverting input terminal of the comparator 14 as the delay time setting voltage $V_{td}$, and when this voltage $V_{td}$ exceeds the threshold voltage $V_{th}$, the output of the comparator 14 takes the High level, which causes the compensation capacitor $C_p$ to begin charging via the resistor $R_1$ and the diode $D_{11}$ in the compensation circuit 20.

Therefore, as illustrated in FIG. 5, the time from when the gate signal takes the High level until when the delay time setting voltage $V_{td}$ exceeds the threshold voltage $V_{th}$ can be set as the delay time (the delay time in the cancellation voltage $V_{nc}$ relative to the rise of the gate signal in FIG. 4) $t_{d1}$ at turn-on of the switching device $Q_1$, which means that this delay time $t_{d1}$ can be adjusted as a function of the capacitance of the delay time setting capacitor $C_t$.

Meanwhile, when the gate signal is at a Low level in order to switch OFF the switching device $Q_1$, the switch 13 gets connected to the negative current source 12 side, and the delay time setting capacitor $C_t$ in the compensation circuit 20 discharges via the resistor $R_3$. At the time of this discharge, the delay time setting voltage $V_{td}$ decreases by an amount equal to the voltage drop across the resistor $R_3$, and therefore the time $t_{d2}$ required for the voltage $V_{td}$ to decrease to the threshold voltage $V_{th}$ is shorter than the turn-on time $t_{d1}$ ($t_{d2} < t_{d1}$).

Similar to as described above, the time from when the gate signal takes the Low level until when the delay time setting voltage $V_{td}$ decreases to the threshold voltage $V_{th}$ can be set as the delay time (the delay time in the cancellation voltage $V_{nc}$ relative to the fall of the gate signal in FIG. 4) $t_{d2}$ at turn-off of the switching device $Q_1$, which means that this delay time $t_{d2}$ can be adjusted as a function of the capacitance of the delay time setting capacitor $C_t$ and the resistance of the resistor $R_3$.

Note that if $t_{d2} > t_{d1}$ due to the properties of the switching device $Q_1$, the orientation of the diode $D_{13}$ can be reversed.

Next, the slopes $dv_r/dt$ and $dv_f/dt$ of the cancellation voltage $V_{nc}$ are determined by the charging current of the compensation capacitor $C_p$ (that is, by the peak compensation current $I_c$) and can therefore be adjusted by changing the resistance values of the resistors $R_1$ and $R_2$ and the capacitance of the compensation capacitor $C_p$ in FIG. 3.

Note that if the slopes $dv_r/dt$ and $dv_f/dt$ are sufficiently large, the resistors $R_1$ and $R_2$ and the diodes $D_{11}$ and $D_{12}$ can be omitted.

Figure 6:
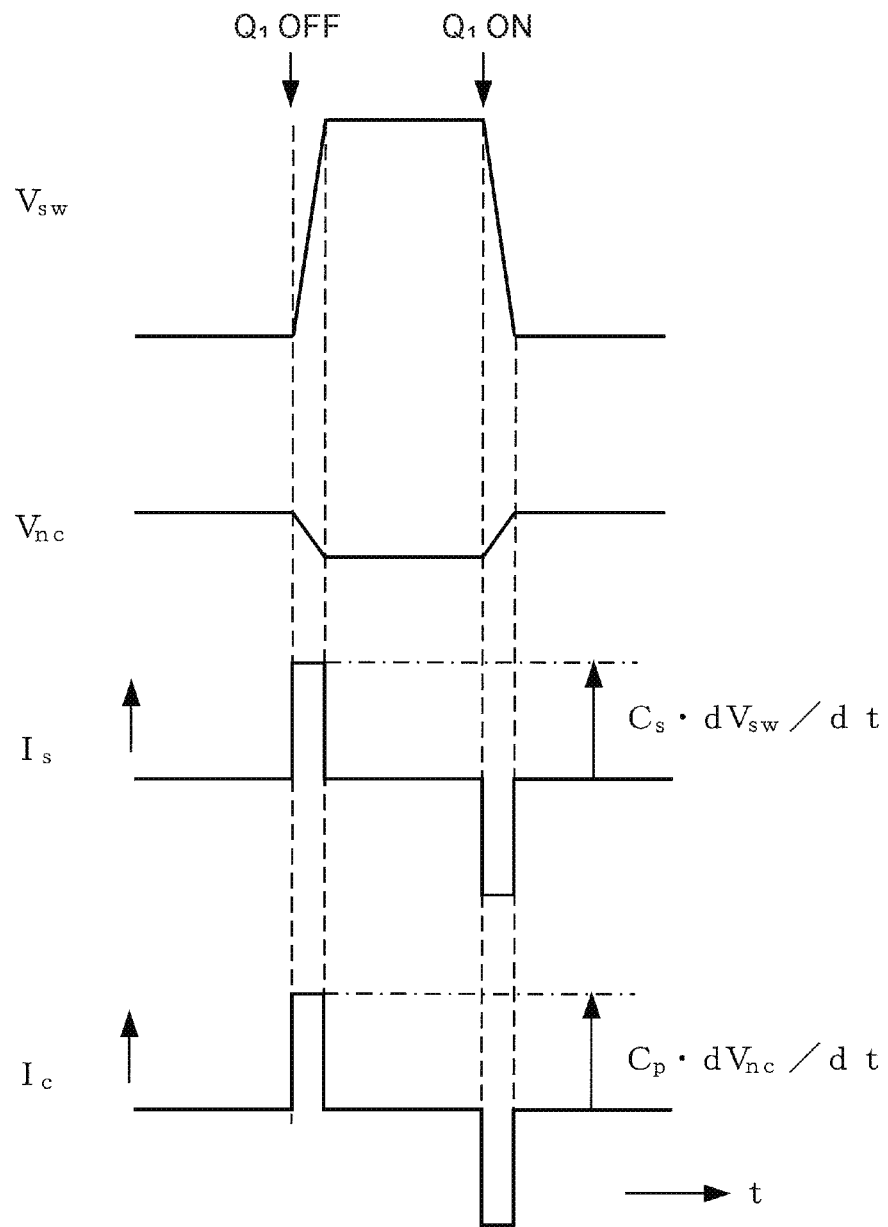
FIG. 6 is a waveform diagram illustrating the drain-source voltage $V_{sw}$ of the switching device, the cancellation voltage $V_{nc}$ a leakage current $I_s$, and a compensation current $I_c$.

Here, the leakage current $I_s$ illustrated in FIG. 1 and the compensation current $I_c$ that flows due to the cancellation voltage $V_{nc}$ can be represented in the form of equations 3 and 4. FIG. 6 illustrates the relationships between the variables $V_{sw}$, $V_{nc}$, $I_s$ and $I_c$ in these equations.

$$I_s = C_s \cdot dV_{sw}/dt \qquad \text{<Equation 3>}$$

$$I_c = C_p \cdot dV_{nc}/dt \qquad \text{<Equation 4>}$$

During typical operation of a PFC circuit or the like, for example, the amplitude of the voltage $V_{sw}$ has a constant value $E_d$. Meanwhile, if the cancellation voltage $V_{nc}$ is taken from a constant voltage such as a control power supply in the control IC 10, the amplitude of the cancellation voltage $V_{nc}$ is also constant.

Moreover, once the mechanical structure of the circuit and device have been finalized, the parasitic capacitance $C_s$ exhibits substantially no change even over time or if the temperature or load or the like changes.

Therefore, setting the capacitance of the compensation capacitor $C_p$ such that equation 5 below is satisfied causes the $I_c$ in equation 4 to have the same amplitude and opposite polarity as the $I_s$ in equation 3. In other words, this makes it possible to cancel out the leakage current $I_s$ with the compensation current $I_c$.

$$C_s \cdot C_p = V_{nc} \cdot E_d \qquad \text{<Equation 5>}$$

As described above, in the present embodiment, the compensation circuit 20 is formed as an external component separately from the main circuit. Therefore, the user can prepare the compensation circuit 20 as an external component in advance with the capacitance values of the capacitors $C_t$ and $C_p$ and the resistance values of the resistors $R_1$ to $R_3$ selected so as to generate a cancellation voltage $V_{nc}$ and compensation current $I_c$ that are appropriate for the load and the specifications of the switching device $Q_1$ in the main circuit (switching delay time, operating frequency, current, voltage, etc.).

This makes it possible to configure the power conversion circuit to have the desired specifications simply by exchanging this external component, thereby making it possible to improve general-purpose usability and cost efficiency.

Note that although the embodiment above was described as using a MOSFET as the switching device $Q_1$, the present invention is applicable to power conversion circuits equipped with various types of semiconductor switching devices that are switched ON and OFF by applying a drive signal (a gate signal or base signal), including IGBTs, power transistors, and the like.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention. For example, the compensation generator portion in the control IC 10 may be provided separately from the control IC 10 or included within the compensation circuit 20.

What is claimed is:

1. A power conversion circuit, comprising:
   a semiconductor switching device;
   a main circuit that performs power conversion through switching on and off of the semiconductor switching device, the main circuit including a controller that supplies a drive signal to the semiconductor switching device to switch on and off the semiconductor switching device,
   a grounded capacitor connected to the main circuit;
   a compensation circuit separate from the main circuit, connected to the main circuit, the compensation circuit including a compensation capacitor; and
   a compensation generator connected to the compensation circuit, the compensation generator charging and discharging the compensation capacitor on the basis of the drive signal so as to generate a cancellation voltage across the compensation capacitor that causes a conducted emission voltage across terminals of the grounded capacitor generated as a result of the switching on and off of the semiconductor switching device to be cancelled out, thereby eliminating conducted emission,
   wherein the compensation generator is included within the main circuit or within the compensation circuit, and
   wherein the compensation circuit further includes a delay time setter that adjusts timings at which the compensation capacitor is charged and discharged in accordance with delay times in ON and OFF switching of the semiconductor switching device relative to the drive signal.

2. The power conversion circuit according to claim 1, wherein the compensation generator is included within the controller of the main circuit, and the compensation generator includes a first current source for charging the compensation capacitor and a second current source for discharging the compensation capacitor that are alternately switched in accordance with the drive signal.

3. The power conversion circuit according to claim 2, wherein the controller is integrated with the first and second current sources into a single integrated circuit.

4. The power conversion circuit according to claim 1, wherein the delay time setter includes a series circuit made of a parallel circuit constituted by a diode and a resistor and a delay time setting capacitor that is connected in series to the parallel circuit, and the series circuit is connected between a ground voltage and the first and second current sources that are alternately switched in accordance with the drive signal.

5. The power conversion circuit according to claim 1, wherein a first series circuit constituted by a diode and a resistor is connected in series to the compensation capacitor for adjusting a leading edge slope of the cancellation voltage, and a second series circuit constituted by a diode and a resistor is connected in series to the compensation capacitor for adjusting a trailing edge slope of the cancellation voltage.

6. The power conversion circuit according to claim 5, wherein the first and second series circuits are included within the compensation circuit.

7. The power conversion circuit according to claim 1,
   wherein the compensation generator is included within the controller of the main circuit,
   wherein the compensation generator includes a first current source for charging the compensation capacitor and a second current source for discharging the compensation capacitor that are alternately switched in accordance with the drive signal,
   wherein the delay time setter includes a series circuit made of a parallel circuit constituted by a diode and a resistor and a delay time setting capacitor that is connected in series to the parallel circuit, and the series circuit is connected between a ground voltage and the first and second current sources that are alternately switched in accordance with the drive signal, and
   wherein the compensation circuit further includes a first series circuit constituted by a diode and a resistor connected in series to the compensation capacitor for adjusting a leading edge slope of the cancellation voltage, and a second series circuit constituted by a diode and a resistor connected in series to the compensation capacitor for adjusting a trailing edge slope of the cancellation voltage.

8. The power conversion circuit according to claim 1, wherein the compensation generator and the compensation circuit are configured to generate the cancellation voltage that has ON/OFF delay times, a leading edge slope and a trailing edge slope that respectively correspond to ON/OFF delay times, a leading edge slope and a trailing edge slope of the conducted emission voltage.

9. A power conversion circuit, comprising:
   a semiconductor switching device;
   a main circuit that performs power conversion through switching on and off of the semiconductor switching device, the main circuit including a controller that supplies a drive signal to the semiconductor switching device for the switching on and off of the semiconductor switching device,
   a grounded capacitor connected to the main circuit;
   a compensation circuit separate from the main circuit, connected to the main circuit, the compensation circuit including a compensation capacitor; and
   a compensation generator connected to the compensation circuit, the compensation generator charging and discharging the compensation capacitor,
   wherein the compensation generator is included within the main circuit or within the compensation circuit, and
   wherein the compensation circuit further includes a delay time setter that adjusts timings at which the compensation capacitor is charged and discharged in accordance with delay times in ON and Off switching of the semiconductor switching device relative to the drive signal.

10. The power conversion circuit according to claim 9,
    wherein a compensation current caused by the compensation generator flows in the compensation capacitor in a first direction when the semiconductor switching device is being turned on so as to charge the compensation capacitor, and wherein the compensation current flows in the compensation capacitor in a second direction that is opposite to the first direction when the semiconductor switching device is being turned off so as to discharge the compensation capacitor.

11. The power conversion circuit according to claim 9, wherein the compensation generator is included within the controller of the main circuit, and the compensation generator includes a first current source for charging the compensation capacitor and a second current source for discharging the compensation capacitor that are alternately switched in accordance with the drive signal.

12. The power conversion circuit according to claim 11, wherein the controller is integrated with the first and second current sources into a single integrated circuit.

13. The power conversion circuit according to claim 10, wherein the compensation generator charges and discharges the compensation capacitor by using the drive signal so as to generate a cancellation voltage for the compensation current across the compensation capacitor that causes a conducted emission voltage across terminals of the grounded capacitor generated as a result of the switching on and off of the semiconductor switching device to be cancelled out, thereby eliminating the conducted emission voltage.

14. The power conversion circuit according to claim 9, wherein the delay time setter includes a series circuit made of a parallel circuit constituted by a diode and a resistor and a delay time setting capacitor that is connected in series to the parallel circuit, and the series circuit is connected between a ground voltage and the first and second current sources that are alternately switched in accordance with the drive signal.

15. The power conversion circuit according to claim 13, wherein a first series circuit constituted by a diode and a resistor is connected in series to the compensation capacitor for adjusting a leading edge slope of the cancellation voltage, and a second series circuit constituted by a diode and a resistor is connected in series to the compensation capacitor for adjusting a trailing edge slope of the cancellation voltage.

16. The power conversion circuit according to claim 15, wherein the first and second series circuits are included within the compensation circuit.

17. The power conversion circuit according to claim 13, wherein the compensation generator is included within the controller of the main circuit, wherein the compensation generator includes a first current source for charging the compensation capacitor and a second current source for discharging the compensation capacitor that are alternately switched in accordance with the drive signal, wherein the delay time setter includes a series circuit made of a parallel circuit constituted by a diode and a resistor and a delay time setting capacitor that is connected in series to the parallel circuit, and the series circuit is connected between a ground voltage and the first and second current sources that are alternately switched in accordance with the drive signal, and wherein the compensation circuit further includes a first series circuit constituted by a diode and a resistor connected in series to the compensation capacitor for adjusting a leading edge slope of the cancellation voltage, and a second series circuit constituted by a diode and a resistor connected in series to the compensation capacitor for adjusting a trailing edge slope of the cancellation voltage.

18. The power conversion circuit according to claim 13, wherein the compensation generator and the compensation circuit are configured to generate the cancellation voltage that has ON/OFF delay times, a leading edge slope and a trailing edge slope that respectively correspond to ON/OFF delay times, a leading edge slope and a trailing edge slope of the conducted emission voltage.

19. The power conversion circuit according to claim 10, wherein the main circuit includes a rectifier circuit having a pair of input terminals to receives an AC voltage input, and an inductor that receives an output of the rectifier, and wherein:
the semiconductor switching device receives an output of the inductor; and
the grounded capacitor is connected to one of the pair of input terminals, and
the compensation current flows through the compensation capacitor, the rectifier, and the grounded capacitor when the semiconductor switching device is turned on and off.

20. The power conversion circuit according to claim 10, wherein:
the compensation generator and the compensation circuit are configured to generate a cancellation voltage for the compensation current,
the cancellation voltage has ON and OFF delay times, a leading edge slope and a trailing edge slope,
the ON delay time corresponds to a time difference between a rising edge of the drive signal and a time at which the semiconductor switching device starts being turned on,
the OFF delay time corresponds to a time difference between a falling edge of the drive signal and a time at which the semiconductor switching device starts being turned off,
the leading edge slope corresponds to changing from the switching off to the switching of the semiconductor switching device, and
the trailing edge slope corresponds to changing from the switching on to the switching off of the semiconductor switching device.

* * * * *